Oct. 18, 1927.  
F. H. HORNING  
1,646,148  
PHONOGRAPH  
Filed Dec. 30, 1920  
7 Sheets-Sheet 1

Inventor:
Frederick H. Horning,
By Fisher, Fowle, Clapp & Soans.
attys.

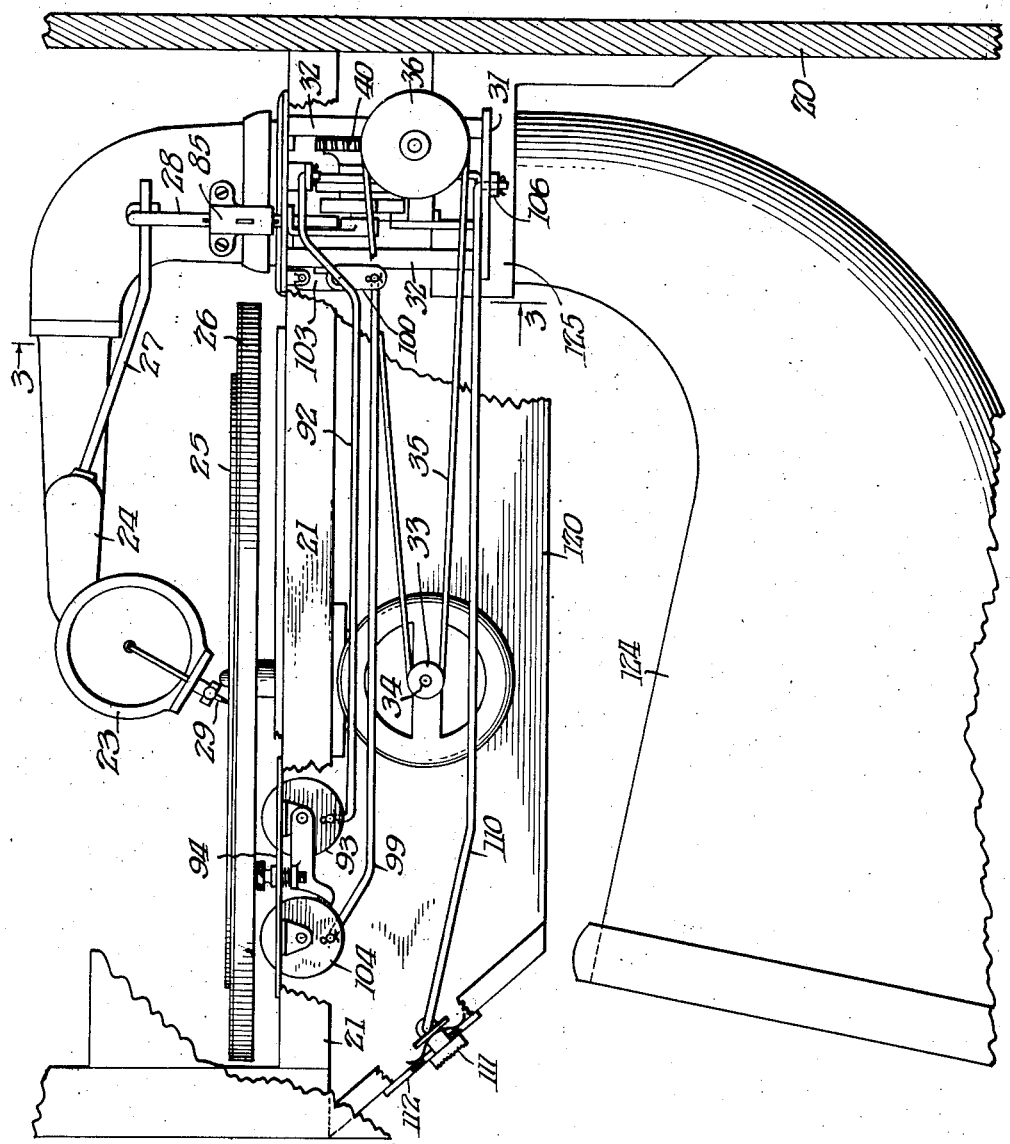

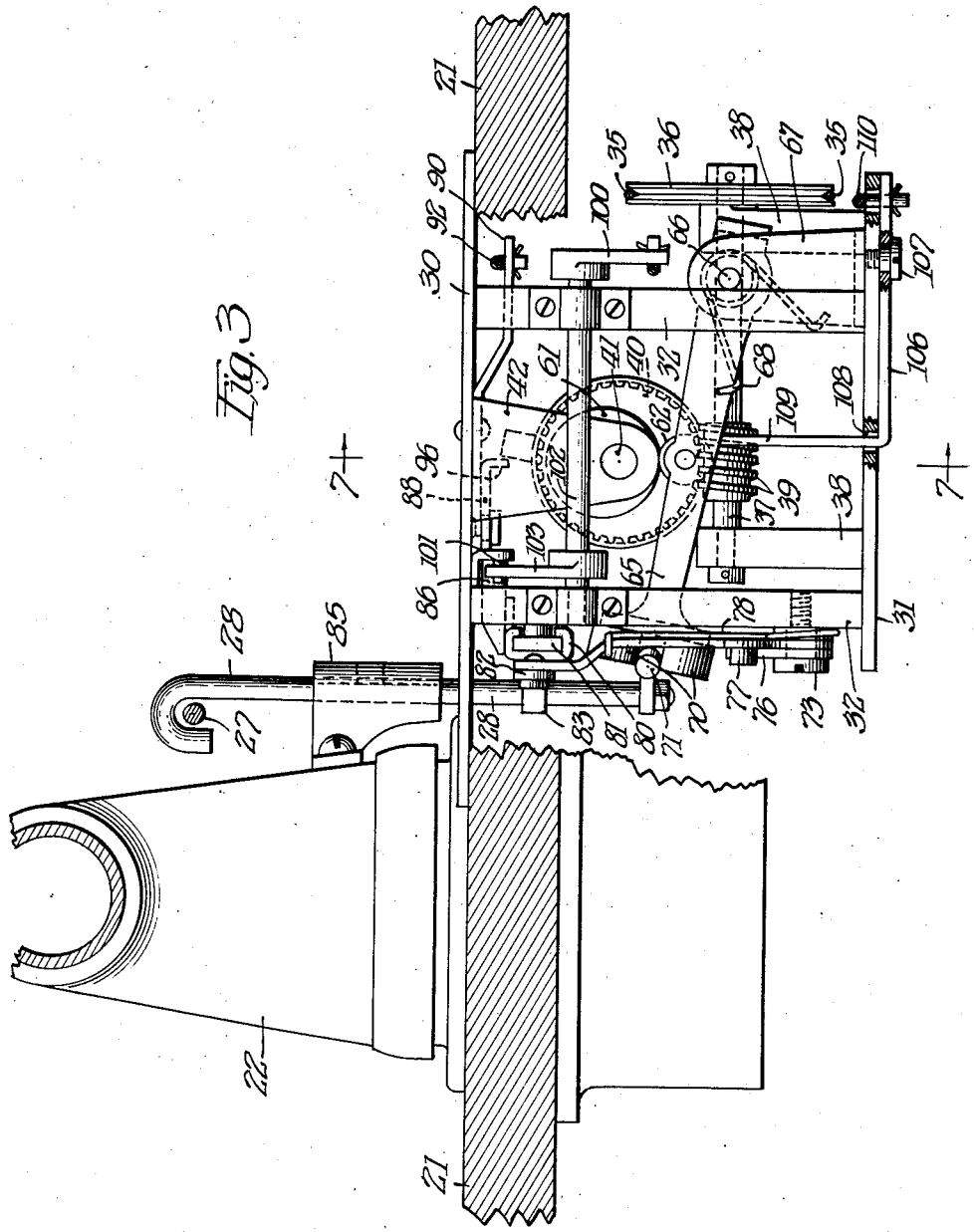

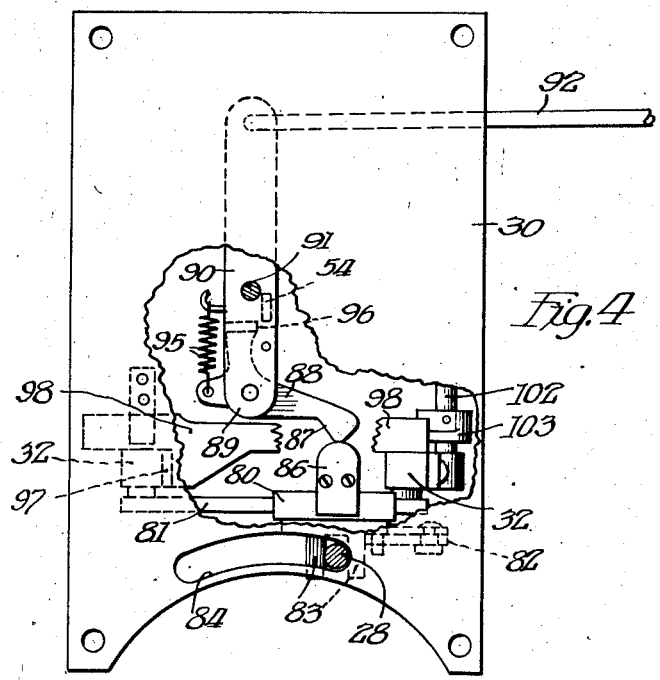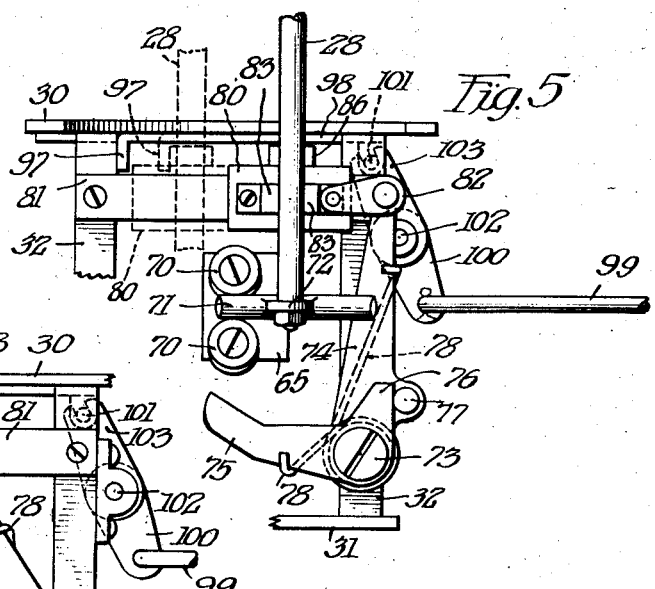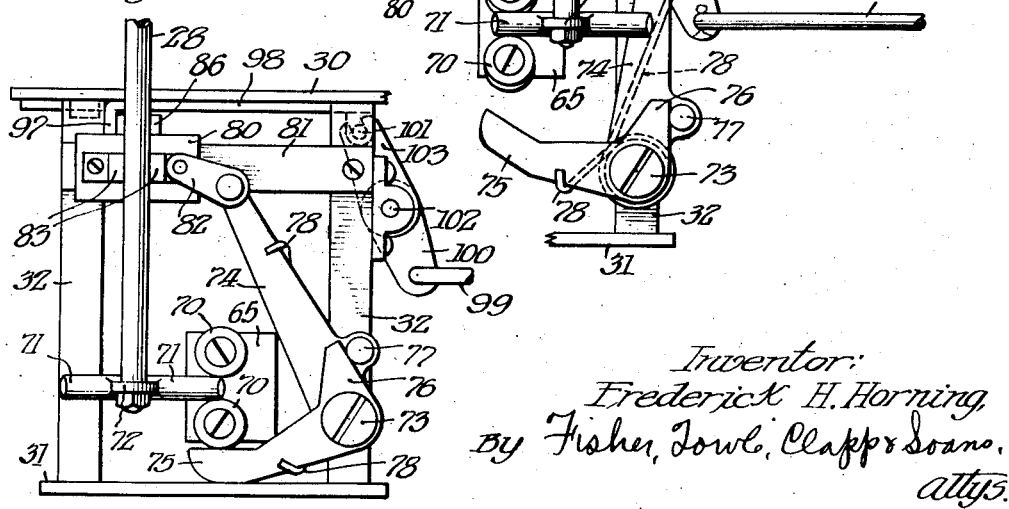

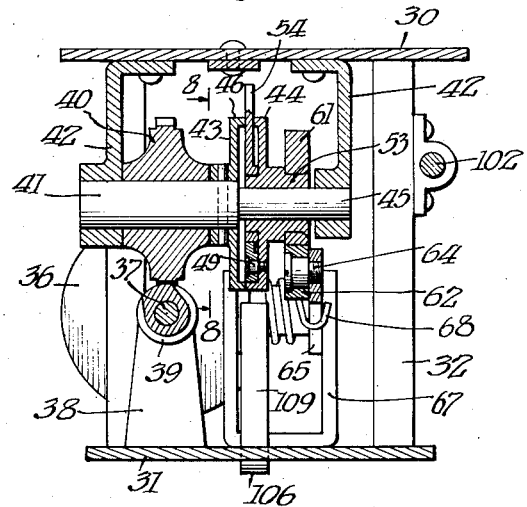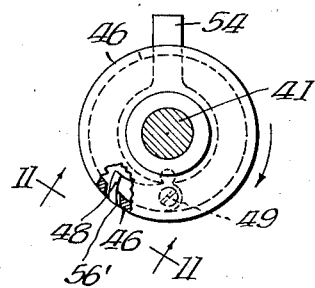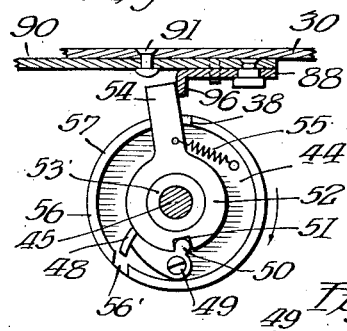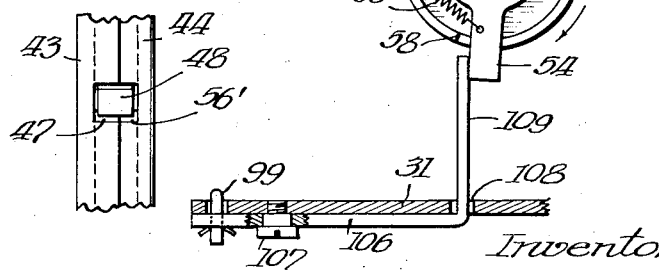

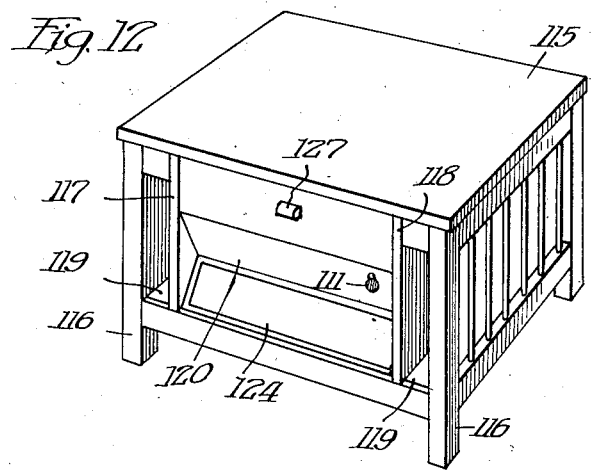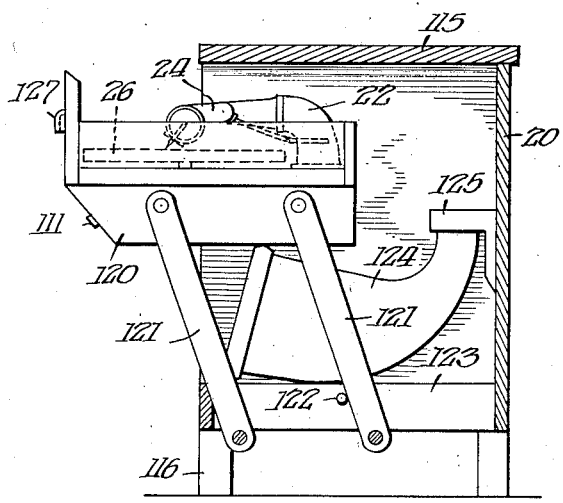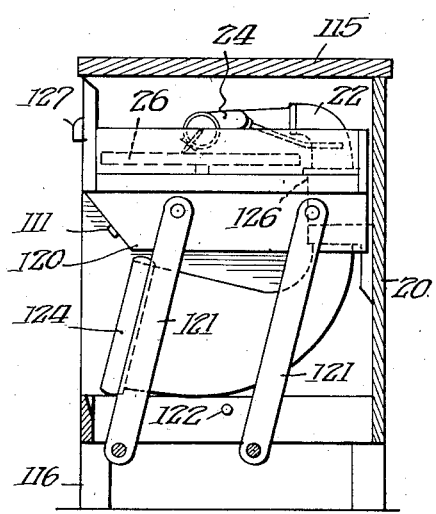

Oct. 18, 1927.

F. H. HORNING 1,646,148

PHONOGRAPH

Filed Dec. 30, 1920    7 Sheets-Sheet 7

Inventor:
Frederick H. Horning,
By Fisher, Fowle, Clapp & Soans.
attys.

Patented Oct. 18, 1927.

1,646,148

UNITED STATES PATENT OFFICE.

FREDERICK H. HORNING, OF TOLEDO, OHIO.

PHONOGRAPH.

Application filed December 30, 1920. Serial No. 433,992.

This invention relates to improvements in phonographs, and has for its primary object to provide a device which is attractive in appearance, simple in construction and efficient in operation.

Another important object of the invention is to provide a repeating mechanism which will cause the entire record or any selected portion thereof to be automatically replayed as many times as may be desired.

A further object is to prevent injury to the record or the sound box during the transmission of the sound box by the repeating mechanism and when the phonograph is not in operation.

Further objects of the invention are to provide a repeating mechanism which may be applied to substantially all phonographs without material alterations in the operating mechanism of said phonographs, to provide positive control for the sound box during the lifting and lowering of the same, to procure upon the completion of the record or the selected portion thereof a quick return of the sound box to the starting position, to prevent rebound of the tone arm at the completion of its lateral swing in the return movement, to procure smooth action in the repeating mechanism, to provide positive actuation for the repeating mechanism, to provide a motor stop controlled by the repeating mechanism, to provide a novel and attractive form of cabinet for the phonograph, and to provide a convenient and advantageous form of mounting for the phonograph within the cabinet.

The many other features and advantages of the invention will be better understood by reference to the following specification when considered in connection with the accompanying drawings illustrating a selected embodiment thereof in which:—

Fig. 2 is a side elevation of the invention with portions of the cabinet removed.

Fig. 3 is a vertical section on the line 3—3 of Fig. 2.

Figs. 4 and 5 are respectively plan and end detail views of the repeating mechanism with the parts in the final position.

Fig. 6 is the same as Fig. 5 with the parts in the initial position.

Fig. 7 is a vertical section on the line 7—7 of Fig. 3.

Figs. 8 to 11 are detail views of the clutch mechanism.

Fig. 12 is a perspective view of the phonograph cabinet.

Fig. 13 is a side elevation of the phonograph cabinet with a portion of the walls removed, the parts being in the extended position and Fig. 14 is the same as Fig. 13, but with the parts in the closed position.

Figure 1:
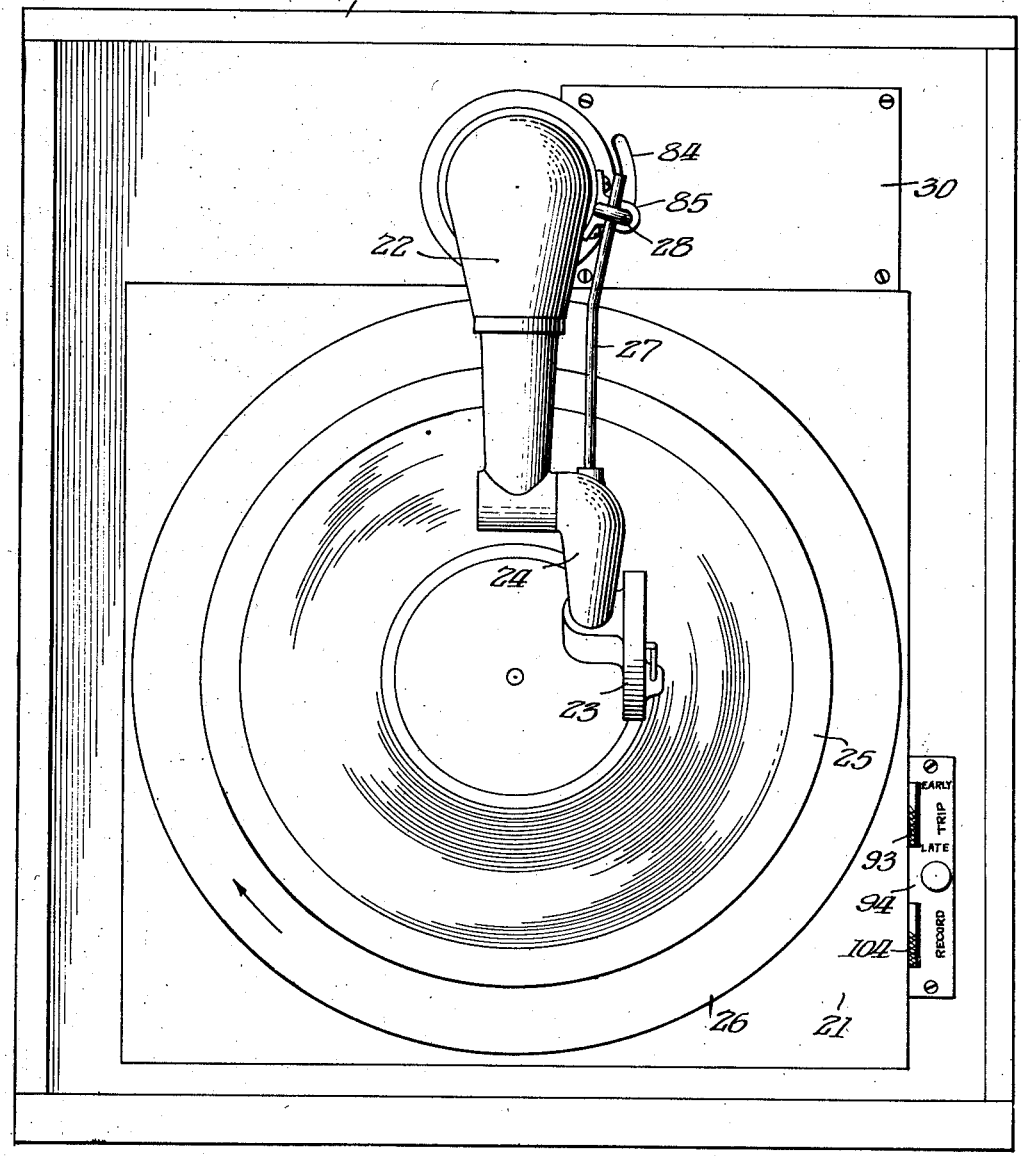
Fig. 1 is a plan view of the invention.
Figure 15:
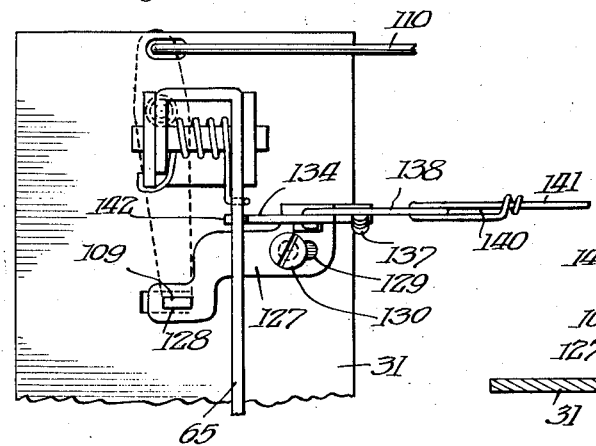
Fig. 15 is a detail plan view of a stop attachment for the repeating mechanism.

Referring to drawings the invention is shown to comprise a cabinet 20 provided with the usual platform 21 on which is mounted the tone arm 22 carrying the sound box 23. The tone arm 22 has its outer sound box supporting section 24 capable of swinging in a vertical plane to permit the sound box to be raised from the record 25 upon the turn table 26. A rod 27 has its forward extremity secured to the portion 24 of the tone arm and this rod projects rearwardly to a point near the base portion of the tone arm where it is engaged by a hook shaped control rod 28 actuated by the repeating mechanism.

The sound box 23 is provided with the usual stylus 29 adapted to operate in the sound reproducing groove in the record 25. This sound box is of the convertible type revolubly mounted upon the outer extremity of the portion 24 of the tone arm to permit its use with either hill and dale or lateral groove records.

A portion of the platform 21 near the base of the tone arm 22 is cut away to permit the repeating mechanism to be inserted therethrough, and this opening is covered by a metal plate 30 which is secured to the top of the platform. The repeating mechanism is preferably formed in a complete unit suspended from the upper face of this platform so as to extend beneath the platform and so that the same may be readily installed or removed intact by merely removing the screws in the plate 30 and lifting this plate sufficiently to withdraw the mechanism through the opening, the control rods being released from the mechanism previous to such withdrawal. A lower plate 31 is suspended from the plate 30 by frames 32.

The repeating mechanism is actuated by a driving pulley 33 mounted upon the usual drive shaft 34 of the phonograph operating mechanism. A belt 35 operatively connects the pulley 33 with the pulley 36 on the shaft 37 supported by the brackets 38 on the plate 31. This shaft carries a worm 39 which meshes with the worm gear 40 upon the shaft 41 supported by the brackets 42 on the plate 30. A clutch element 43 is secured upon the shaft 41 and a corresponding clutch element 44 is freely mounted upon the reduced portion 45 of this shaft. The clutch element 43 is provided with an angular flange 46 and a slot 47 is formed in the edge of this flange to admit the locking block 48 of the clutch. This locking block 48 is pivotally mounted at 49 on the clutch element 44 and is provided with a protuberance 50 which fits within a notch 51 in the operating member 52 revolubly mounted on the hub 53 of the clutch member 44.

The member 52 is provided with an operating arm 54 projecting radially therefrom. A spring 55 connecting the arm 54 with the member 44 normally forces the block 48 into locking engagement with the clutch member 43. The clutch member 44 is provided with a peripheral flange 56 having a slot 56' therein corresponding to the slot 47 in the clutch element 43, and a cut away portion 57 to permit a certain limited swinging of the arm 54 relative to clutch element 44. A shoulder 58 is formed on this flange to form a stop for the arm 54. Viewing the clutch as shown in Fig. 9 of the drawings, rotation of the member 44 with respect to the arm 54 in a clockwise direction relative to the member 52 while the latter is restrained from movement, causes the block 48 to be withdrawn from the slot 47 in the clutch member 43 by rocking on its pivot 49 and the corresponding slot 56' in the member 44 against the action of the spring 55. A cam 61 is secured upon the hub 53 of the clutch element 44 and this cam coacts with the cam roll or roller 62 on the stud shaft 64 seated in the arm 65. The arm 65 is pivotally mounted on the shaft 66 supported by the bracket 67 on the base plate 31, and is normally yieldingly supported in its uppermost position by the spring 68.

The outer extremity of the arm 65 is provided with a pair of rollers 70 and a rod 71 rests between these rollers and is movable longitudinally of its axis therebetween. The lower extremity of the rod 28 passes through a perforated lug 72 on this rod 71 and is rigidly secured thereto. The rod 28 is therefore raised or lowered by the corresponding movement of the arm 65. A stud shaft 73 is mounted on one of the uprights of the frame 32, and the arms 74 and 75 are pivoted upon this shaft. The arm 75 is provided at its inner end with a lateral projection 76 which engages the stop pin 77 projecting from the arm 74. A spring 78 fits about the stud shaft 73 and has its opposite extremities engaging the arms 74 and 75 respectively. Depression of the arm 75 under the action of the lower roll 70 causes the arm 74 to swing in a counter-clockwise direction.

A slide 80 is carried upon the slide bar 81 supported on the frame 32 and this slide is connected by a link 82 with the outer extremity of the arm 74 so that the swinging of the arm causes the slide to move horizontally along this bar. A pair of lugs 83 project laterally from the slide 80 and are disposed on opposite sides of the rod 28 so that movement of this slide longitudinally of the bar 81 causes the rod to be correspondingly moved. The rod 71 is of sufficient length to permit some portion thereof to always remain between the rolls 70 so that depression or elevation of these rolls will cause a corresponding movement of the rod 28 irrespective of the position of the slide 80. An arcuate slot 84 is formed in the plate 30, and the rod 28 passes through this slot. The center of curvature of the slot 84 is the vertical axis of the tone arm 22. A support 85 for the rod 28 is secured to base of the tone arm, and this support permits the rod to move longitudinally therein while being carried with the tone arm. The lugs 83 are of sufficient length to permit movement of the rod 28 toward and from the slide as this rod swings with the tone arm.

An arm 86 is secured upon the slide 80 and the outer extremity of this arm coacts with the corresponding outer projection 87 of the trip 88 pivotally mounted on the extremity 89 of the arm 90. The arm 90 is pivoted at 91 on the under face of the plate 30. A control rod 92 has its inner extremity secured to a knurled operating wheel 93 supported on the plate 94 on the platform 21. The trip 88 is controlled by the spring 95 and is provided with a turned down lug 96 which forms a stop for the arm 54 controlling the clutch on the shaft 41. Longitudinal movement of the rod 92 shifts the position of the trip 88 relative to slide bar 81 to cause earlier or later actuation of the trip. In Fig. 4 of the drawings the trip is shown in engagement with the arm 86 and the lug 96 is moved out of engagement with the arm 54. The spring 55 moves the arm 54 in a clockwise direction as viewed in Fig. 9, causing the block 48 to engage clutch member 43. The clutch member 44 and the cam 61 rotate with a shaft 41. At the time of release of the arm 54 by the trip 88, the cam 61 is in the position shown in Fig. 3 with the arm 65 raised and the roll 62 in contact with the cam. Rotation of the cam by the shaft 41 causes the arm 65 to be forced downwardly, drawing with it the rod 28 and raising the stylus from the record groove. When the arm 65 has been depressed sufficiently to cause the under roll 70 to engage the arm 75, the slide 80 which is now in the position shown in Fig. 5, will be moved longitudinally of the bar 81 until its advance is stopped by the downwardly projecting lugs 97 on the control arm 98. The arm 65 continues to move downwardly to its extreme position under the action of the cam 61 even though the slide has been stopped previously, as the arm 75 is permitted to move relative to arm 74 by the spring 78. The formation of the cam 61 is such that the rod 28 will be positively depressed and held in this depressed position to maintain the stylus out of engagement with the record until the slide has moved the full extent of its travel as determined by the stop 97. The spring 68 causes the rod to rise and the stylus is lowered into the sound groove at the predetermined position. The travel of the slide from the position shown in Fig. 5 to the position shown in Fig. 6 causes the tone arm to be rotated and the stylus returned to the starting position. The slide 80 is moved in the reverse direction by the advance of the stylus in the record groove during the playing of the selection. The rod 99 is controlled by the knurled operating wheel 104 mounted on the plate 94 in the same manner as the wheel 93.

A stop arm 106 is pivotally mounted on the stud screw 107 in the under face of the plate 31 and this arm 106 passes upwardly through the slot 108 in this plate. The upper extremity 109 of this stop 106 is adapted to be moved into the path of the arm 54 so that when this arm is rotating with the shaft 41 in the manner described it will engage the stop 106 and release the clutch 44. This position of the parts is illustrated in Fig. 10 of the drawing. The stop 106 is controlled by the rod 110 operated by a sliding button 111.

In order to play a portion of a record, the stop 97 is moved by turning the wheel 104 until this stop will limit the outward swing of the tone arm to the proper distance from the axis of the turn table. The trip 88 is then adjusted by means of the wheel 93 to release the arm 54 at the proper point in the inward travel of the tone arm. By thus varying the relative positions of the stop 97 and the trip 88, it is possible to cause the phonograph to automatically repeat any selected portion of the record. To play the entire record the trip should be set to release the arm 54 at the termination of the sound impression. Usually in records the groove continues for a number of revolutions of the turn table after the completion of the sound impression so that with the present invention it is possible to commence the repetition of the selection almost immediately upon the completion of the previous rendition. This eliminates the necessity for permitting the stylus to run out of the groove, which usually produces disagreeable noises in the instrument, and not infrequently results in damage to the sound box or the record.

In the operation of the repeating mechanism the stop 97 and the trip are adjusted in the manner described and the button 111 is slid upwardly on the plate 112 to withdraw the stop 106. This causes the clutch 44 to engage and the cam 61 is rotated with the shaft 41. The stylus is lowered into the groove in the record at the starting point and the instrument will continue to play and replay the record between the limits determined. To stop the operation of the instrument, the button 111 is slid downwardly on the plate 112, moving the stop 106 into the position of engagement. The operation will continue until the trip is engaged by the arm 86 which is at the completion of the playing of the selection. The cam has made a half revolution prior to being engaged by the stop 106 which has caused the stylus to be raised and the tone arm to be moved to the initial position. The stylus is wholly out of engagement with the record. This is a paricularly advantageous feature as it prevents any possibility of the stylus being accidentally moved across the face of the record while in engagement therewith.

The cam 61 provides a positive support for the sound box during the lifting, transmission and lowering movement, and insures a gentle entry of the stylus into the groove. The rapidity of the raising and lowering of the stylus depends upon the conformation of the cam.

In Figs. 12 to 14 inclusive of the drawings is shown a very attractive and advantageous form of cabinet and supporting means for the phonograph within the same. This cabinet 20 resembles in appearance a library table and has a stationary top 115 supported by legs 116. Oppositely disposed partitions 117 and 118 extend from front to rear of the table and inclose the phonograph mechanism. Compartments 119 are provided outside of these partitions to hold records. The phonograph mechanism is mounted in a tray or drawer 120 which is supported by oppositely disposed pairs of links 121 pivotally mounted upon the side partitions 117 and 118. Stops 122 or other suitable means may be provided to limit the forward movement of the tray 120. The horn 124 has its small end supported by bracket 125 and the large end thereof rests upon the leg braces 123 or is supported in any other suitable manner. A sound tube 126 within the tray 120 forms the means of communication between the upper end of the horn 124 and the base of the tone arm 22 when the tray is in the closed position, as shown in Fig. 14.

To place a record upon the turn table 26, or to adjust the repeating mechanism, the tray is drawn forward by the handle 127. The cabinet is closed by pressing against the front of the tray. The phonograph may be stopped or started without withdrawing the tray as the control button 111 is exposed at the front of the cabinet.

Figs. 15 to 18 inclusive show an attachment operated by the repeating mechanism for stopping the phonograph motor. A plate 127 rests upon the base plate 31, and the inner extremity of this plate is provided with a perforation 128 to receive and fit about the stop 109. This plate 127 is likewise provided with an elongated slot 129 to receive the binding screw 130 which acts as a guide therefor. The plate 127 is provided with an upturned lug 131 on which is pivoted the bell crank 132 at 133. The bell crank arm 134 forms a stop for the rock arm 65. A stop 135 on the bell crank 132 is normally retained against the pin 136 on the lug 131 by spring 137.

A pull rod 138 has one extremity connected to the upper end of the arm 132 and the opposite extremity of this rod is provided with a loop 139 which interlocks with a corresponding loop 140 on one extremity of the pull rod 141. The opposite extremity of this rod 141 is connected to the usual turn table brake (not shown) of a spring driven motor or the switch in an electrically operated phonograph.

Figure 17:
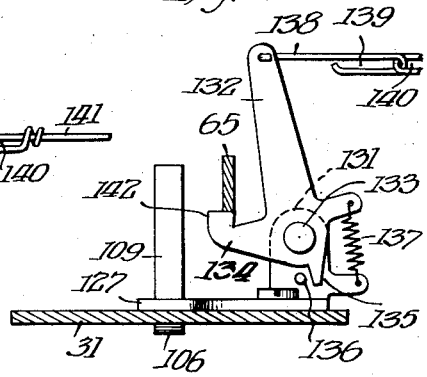
Fig. 17 is the same as Fig. 16, but with the parts in the final or stopped position.
Figure 16:
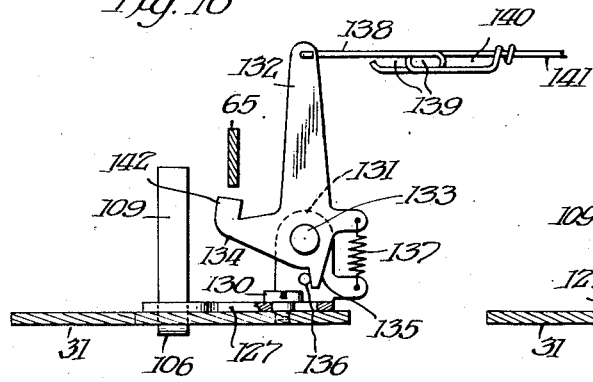
Fig. 16 is a detail end elevation of the attachment shown in Fig. 15, with the parts in the position to stop the motor.
Figure 18:
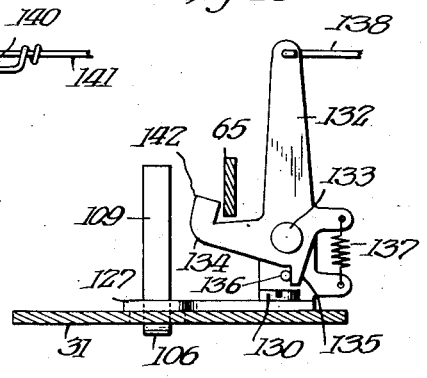
Fig. 18 is the same as Fig. 16, but with the stop mechanism in the inoperative position.

Movement of the control rod 110 in the manner described to stop the repeating mechanism brings the arm 134 beneath the rocker shaft 65 as shown in Fig. 16, so that the downward movement of the rocker arm depresses this arm and causes the bell crank to rotate in a counter-clockwise direction to the position of Fig. 17. This causes the rod 141 to be drawn longitudinally by the rod 138 and stops the motor. When the button 111 is raised to start the mechanism the plate 127 is drawn into the position shown in Fig. 18 so that the rocker arm 65 is free to pass downwardly inside of the projection 142 and the bell crank. The loops 139 and 140 are provided to permit the bell crank to swing to nearly the full extent of its travel before the rod 141 is actuated by the rod 138. When the motor is started the turn table will make a number of revolutions and attain its normal operative speed before the stylus enters the groove so that the disagreeable sounds produced by the increasing speed of the turn table are eliminated. This stop device when used in connection with the repeating mechanism provides a simple and efficient means for stopping and starting the motor simultaneously with the repeating mechanism.

I am aware that many changes in the construction and arrangement of parts may readily be made without departing from the spirit of my invention and I reserve the right to make all such changes as fairly fall within the scope of the following claims.

I claim as my invention:

1. A repeating device for phonographs comprising means for lifting the stylus from one position on the sound reproducing record and transferring said stylus to a different position thereon, a drive shaft, a cam free upon said shaft, and means for automatically locking said cam upon said shaft at a predetermined position of said stylus to cause said cam to actuate said lifting and transferring means.

2. A repeating device for phonographs comprising means for lifting the stylus from the sound reproducing record in one position thereon, and transferring said stylus to a different position thereon, a drive shaft, a cam free upon said shaft, clutch means for locking said cam upon said shaft, clutch actuating means, and adjustable means for controlling the actuation of said clutch means to cause said cam to positively operate said lifting and transferring means.

3. A repeating device for phonographs comprising means for successively lifting the stylus from the sound reproducing record and moving said stylus laterally over the face of said record including a lifting rod engaging the vertically movable outer portion of the tone arm, a slide engaging said rod, a rocker arm coacting with said lifting arm and said slide, and a cam coacting with said rocker arm.

4. A repeating device for phonographs comprising means for successively lifting the stylus from the sound reproducing record and moving said stylus laterally over the face of said record including a lever connected to the vertically movable outer portion of the tone arm, a lifting rod engaging said lever, a slide engaging said lifting rod, a rocker arm coacting with said lifting arm and said slide, an actuating cam coacting with said rocker, and means operatively connected with the main drive shaft of the phonograph for actuating said cam at a predetermined position in the advance of the stylus.

5. A repeating device for phonographs comprising a lifting rod, a slide coacting with said rod to move said rod laterally, a rocker arm actuating said rod and said slide, and adjustable means for limiting the travel of said slide in either direction.

6. A repeating device for phonographs comprising a lifting rod, a slide coacting with said rod, a rocker arm actuating said rod and said slide, a cam actuating said arm, an adjustable stop limiting the travel of said slide in one direction, and an adjustable trip limiting the travel of said slide in the opposite direction.

7. A repeating device for phonographs comprising a sound box lifting rod mounted on the tone arm, a slide engaging said rod and movable with the tone arm in one direction, a rocker arm adapted to operatively engage said rod and said slide to move said tone arm in the opposite direction and means for actuating said arm.

8. A repeating device for phonographs comprising a sound box lifting rod mounted on the tone arm, a slide engaging said rod and movable with the tone arm in one direction, a rocker arm adapted to operatively engage said rod and said slide to move said tone arm in the opposite direction, means for actuating said arm, and adjustable means for determining the extent of the movement of said tone arm in either direction.

9. A phonograph comprising a record-carrying disk, a stylus adapted to follow the sound-reproducing groove in the record on said disk, repeating mechanism constituting an independent removable unit for lifting said stylus from said record, moving the stylus laterally over the face of the record while in lifted position, and lowering said stylus at the completion of said lateral movement, means to vary the lateral limits of movement of the stylus and means movable into position to stop the travel of said stylus at the completion of said lateral movement in predetermined relation to the lowering of the stylus.

10. A repeating mechanism for phonographs comprising means for lifting the stylus from the sound-reproducing record, moving said stylus laterally over the face of said record while in lifted position, and lowering said stylus upon said record at the completion of said lateral movement, and means movable into position to automatically render said repeating mechanism ineffective at the completion of said lateral movement and before the stylus is lowered.

11. A phonograph comprising a record-carrying disk, a stylus adapted to follow the sound-reproducing groove in the record on said disk, repeating mechanism for lifting said stylus from said record, moving the stylus laterally over the face of the record while in lifted position, and lowering said stylus at the completion of said lateral movement, and means associated with the repeating mechanism and movable into position to stop the travel of said stylus at the completion of said lateral movement and before the stylus is lowered.

FREDERICK H. HORNING.